(12) United States Patent
Jarvinen et al.

(10) Patent No.: US 8,958,765 B2
(45) Date of Patent: Feb. 17, 2015

(54) MULTIFUNCTION CONTROL INDICATOR FOR A VEHICULAR MOBILE RADIO

(75) Inventors: Jari P. Jarvinen, Coral Springs, FL (US); Craig F Siddoway, Davie, FL (US); Chi T. Tran, Weston, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 441 days.

(21) Appl. No.: 13/399,332

(22) Filed: Feb. 17, 2012

(65) Prior Publication Data
US 2013/0217351 A1  Aug. 22, 2013

(51) Int. Cl.
*H04B 1/06* (2006.01)

(52) U.S. Cl.
USPC .......................................... 455/230; 381/86

(58) Field of Classification Search
CPC ...... H04B 1/082; H04B 10/116; H04B 10/40; H05B 33/0803; H05B 33/0845; H05B 37/0218
USPC ............... 370/335, 338, 438; 455/179.1, 344, 455/128, 402, 41.1–41.3, 414.1, 406, 407, 455/422.1, 435.2
See application file for complete search history.

(56) References Cited

U.S. PATENT DOCUMENTS

| 5,408,275 | A | * | 4/1995 | Song et al. | ..................... 348/734 |
| 7,340,333 | B2 | | 3/2008 | Lenneman et al. | |
| 7,960,636 | B2 | | 6/2011 | Demsey et al. | |
| 2003/0190141 | A1 | * | 10/2003 | Kaneshiro | ........................ 386/46 |
| 2006/0092129 | A1 | | 5/2006 | Choquet et al. | |
| 2008/0266864 | A1 | * | 10/2008 | Ryder et al. | .................. 362/282 |
| 2009/0234474 | A1 | * | 9/2009 | Steiner et al. | .................... 700/94 |
| 2010/0125393 | A1 | * | 5/2010 | Jarvinen et al. | .................. 701/48 |
| 2010/0188343 | A1 | * | 7/2010 | Bach | ............................ 345/173 |

FOREIGN PATENT DOCUMENTS

| JP | 2000016058 A | 1/2000 |
| JP | 2007283866 A | 11/2007 |
| JP | 2008301451 A | 12/2008 |

OTHER PUBLICATIONS

International Search Report for International Patent Application No. PCT/US2013/25544 mailed Aug. 2, 2013.

* cited by examiner

*Primary Examiner* — Golam Sorowar
(74) *Attorney, Agent, or Firm* — Barbara R. Doutre; Daniel R. Bestor

(57) ABSTRACT

An improved user interface is provided for a front control panel (104) of a vehicular mobile radio (100) operating in a public safety environment. A multifunction control indicator is formed of a mode indicator light ring (126) co-located about a perimeter of a multifunction control knob (124). The multifunction control knob (124) controls two or more radio functions, such as volume and channel change. The mode indicator light ring (126) generates different lighting configurations in response to the multifunction control knob (124) being pressed to change radio functions. Numerous radio functions can be monitored and controlled via the multifunction control knob (124) and mode indicator light ring (126).

15 Claims, 4 Drawing Sheets

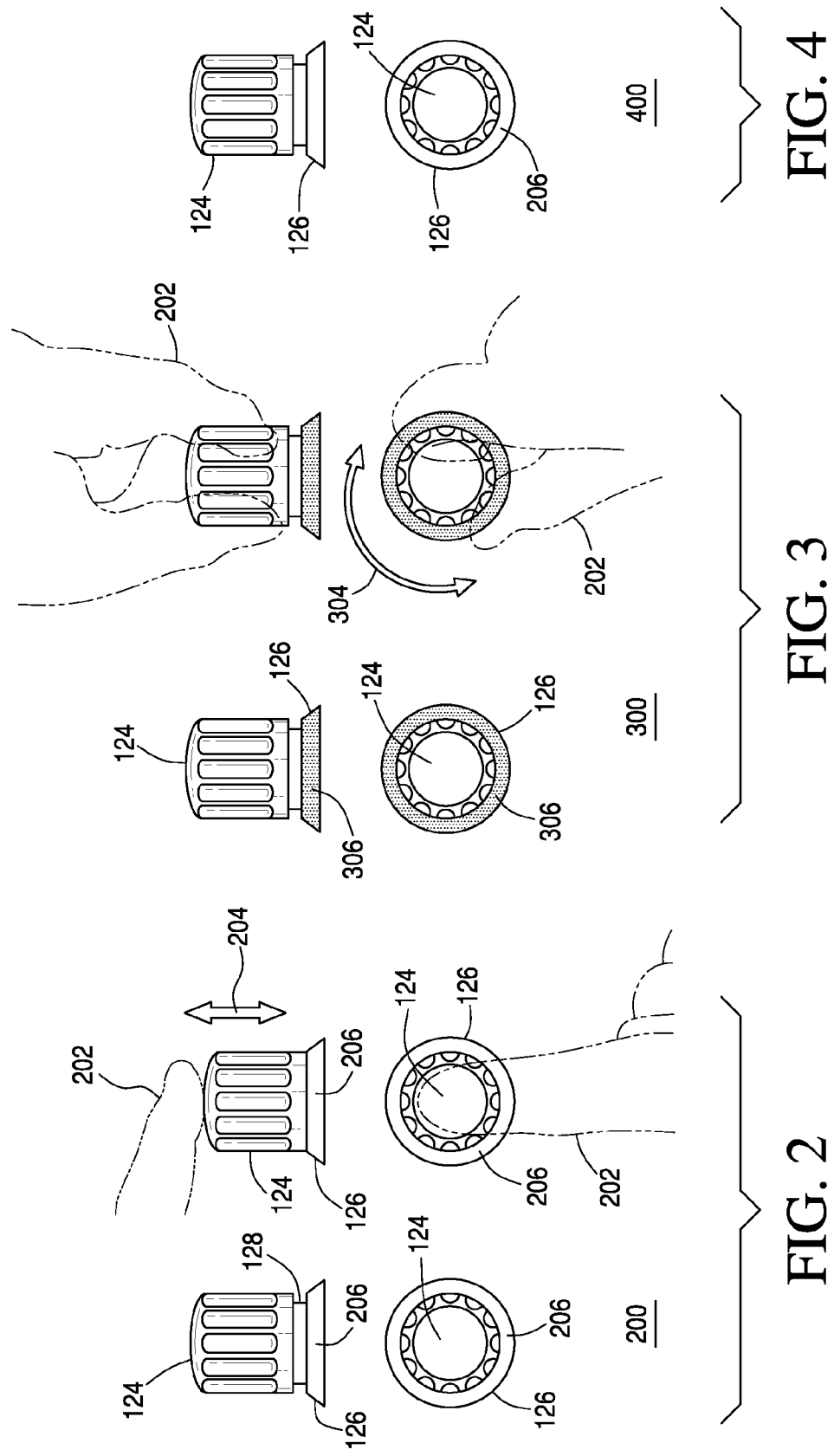

MULTIFUNCTION CONTROL INDICATOR
FOR A VEHICULAR MOBILE RADIO

FIELD OF THE INVENTION

The present invention relates generally to a mobile radio utilized in a public safety vehicle, and more particularly to control indicators utilized on such radios.

BACKGROUND

Communication devices, such as mobile two-way radios utilized in public safety vehicles, often include a plurality of user interface features. When operating in public safety environments, a mobile radio having a good user interface is extremely important.

The available surface area for controls on a vehicular mobile radio is limited, making the accommodation of numerous control knobs, keys, and switches difficult. Oftentimes, the user needs to be able to manipulate radio functions while performing other tasks, such as driving or attending to emergency care, and as such the use of numerous controls and separation of related controls may lead to confusion or distraction. Additionally, the vehicular mobile radio must often be operated during vehicular motion and vibration making the ability to manipulate controls even more difficult.

During mission critical applications it is very important to easily identify the operating mode of the mobile radio and to make adjustments to the operating mode as necessary.

Accordingly, there an improved user interface for a vehicular mobile radio is highly desirable.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 2 is the multifunction control knob and mode indicator light ring in a first light configuration in accordance with an embodiment.

FIG. 3 is the multifunction control knob and mode indicator light ring in a second light display configuration in accordance with an embodiment.

FIG. 4 is the multifunction control knob and mode indicator light ring reverted back to the light configuration of FIG. 1 in accordance with an embodiment.

Figure 1:
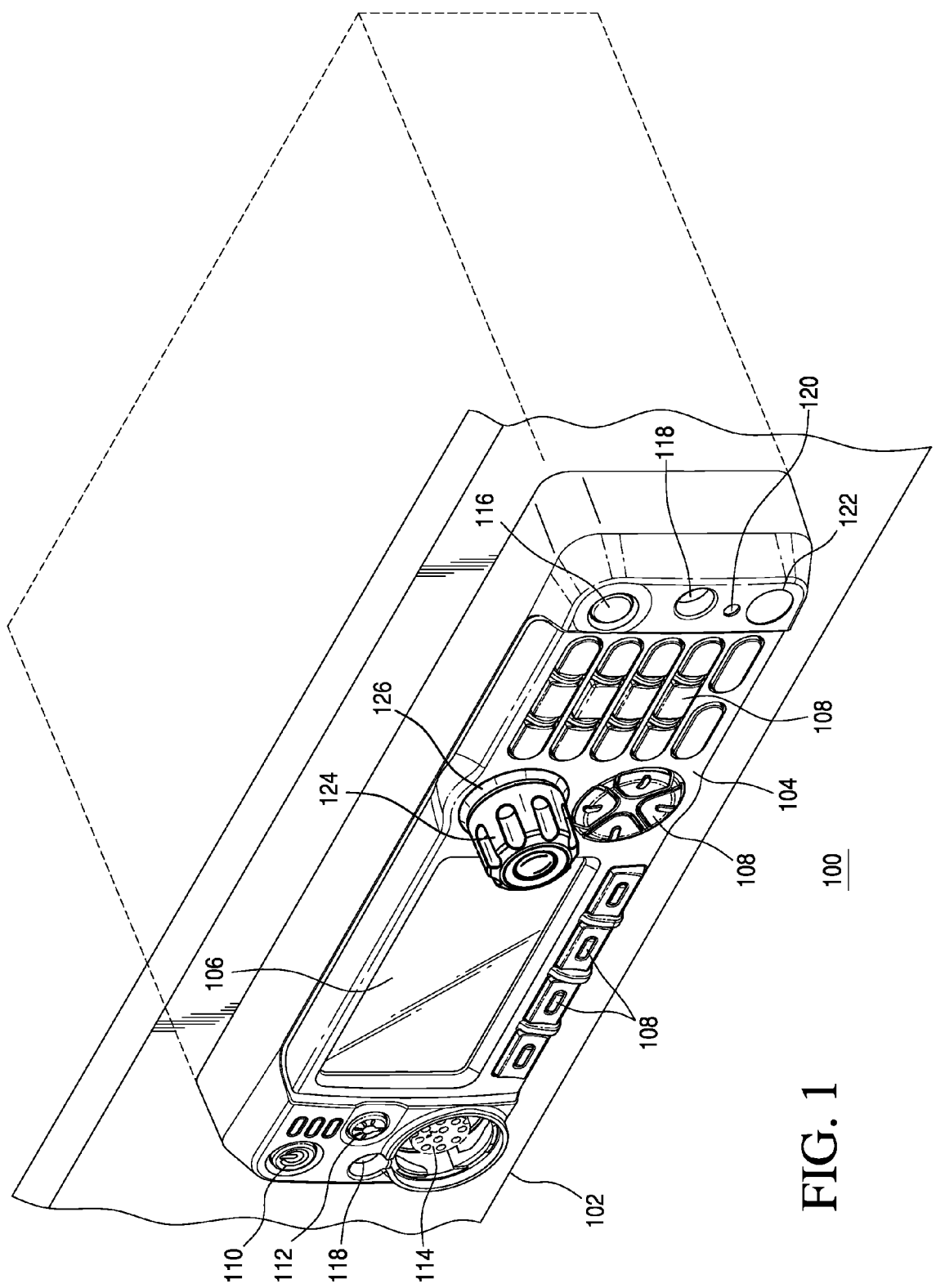
FIG. 1 is a vehicular mobile radio having a multifunction control knob and a mode indicator light ring in accordance some of the embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in components providing an improved user interface for a control panel of a vehicular mobile radio operating in public safety environments.

Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Briefly, there is provided herein an improved multifunction control knob user interface. The multifunction control knob user interface is highly suitable to mobile radios utilized in vehicles operating within public safety environments, such law enforcement, fire rescue, and/or other agency related users. One multimodal control is used to replace two or more traditional dedicated controls. Depending on the mode of the control, a different function is controlled. In order to know which function the user is adjusting at any given time when using the multifunction control knob, a mode indicator light ring is co-located about the multi-function control knob. Depending on the mode of the control, a different function is controlled, and each function is indicated using different lighting configurations of the mode indicator light ring.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 is a vehicular mobile radio 100 in accordance some of the embodiments. Vehicular mobile radio 100 which will also be referred to as mobile radio 100 operates within a public safety environment. Electronic circuitry (not shown) within a housing of the mobile radio 100 provides controller and transceiver circuits for radio operation within the public safety environment. Mobile radio 100 is installed within a public safety vehicle, such as a police car, fire truck, ambulance or the like. Installation of the mobile radio 100 within the vehicle may be a dash mount 102 configuration, or a remote mount configuration within the vehicle is also possible. Dash mounted configurations may be operated by a driver or front passenger of the vehicle, for example an police officer or driver of a fire truck, while remote mount configurations may be operated by other passengers of the vehicle, such as emergency rescue personal located in the back of an emergency rescue vehicle.

The mobile radio 100 comprises a front control panel 104 having a plurality of controls, and in accordance with the various embodiments, at least one of the controls is a multifunction control knob 124 with mode indicator light ring 126 co-located about a perimeter of the multifunction control knob. The multifunction control knob 124 is a known rotary, push-type control knob mounted to the front control panel 104 using known mounting techniques. As such, the components of multifunction control knob 124 will not be described in further detail. A push or press of the knob is all that is needed, no pulling of the knob is required. In accordance with the various embodiments, the multifunction control knob 124 and mode indicator light ring 126 provide a multifunction control indicator for an improved user interface of the mobile radio 100.

The remaining controls of the plurality of controls may comprise a display 106, a plurality of keys 108, and power button 110. Further controls may comprise a dimmer button 112, accessory interface 114 (such as for a microphone or headset), and emergency button 116. Screws 118 are shown as part of a mounting means, however other mounting means can be used as well. Near-field pairing (for example BLUETOOTH) and a company logo may also be present on the front control panel 104. Hence, numerous control features are located on the front control panel 104 of mobile radio 100.

The plurality of control features are often operated while the vehicle is being driven, and thus the user interface of mobile radio 100 has been designed for ease of use. For example, the plurality of keys 108 may comprise soft keys, DTMF keypad, navigation keys, home key, and data mode key to name a few. Each grouping of keys may be shaped differently to facilitate user tactile feedback. For example, the navigation keys may be shaped as cloverleaf triangular keys. The soft keys located beneath the display may be shaped with a hollow portion having a detent. The outer edges of the DTMF keypad may have rounded edges delineating a perimeter to the keypad. The various shapings and groupings provide a tactile definition which allows a user to feel and become familiar with the various functions provided by the plurality of keys. Other functions are best handled by control knobs, however as seen in FIG. 1, once the display 106 and plurality of keys 108 have been laid out, little space remains available for different control knobs. Also, having more than one control knob in such a tight space may lead to inadvertent actuation.

In accordance with the various embodiments, the multifunction control knob 124 is located on the front control panel 104 and the mode indicator light ring 126 is disposed on the control panel about a perimeter of the knob. In accordance with the embodiments, the mode indicator light ring 126 surrounds the base of the multifunction control knob 124 to indicate an operating function of the mobile radio 100. The mode indicator light ring 126 provides a single ring which displays a plurality of lighting configurations depending on the operating mode of the multifunction control knob 124. The multifunction control knob 124 changes radio operating functions in response to being pressed and adjusts each function in response to rotation of the knob.

In accordance with the various embodiments, the multifunction control knob 124 controls at least two functions. The two functions may be, for example, volume control and channel control. Other functions such as frequency, talkgroup, and zone would also be suitable functions. The mode indicator light ring 126, co-located about the perimeter of the multifunction control knob 124, changes in response to the knob being pushed in, providing a different visual lighting configuration via the single ring display. Thus, the user is provided with an improved user interface as the function is indicated by the single display which can be viewed at a glance. Adjustments can be made by rotating the multifunction control knob. Thus, a multifunction control knob 124 and a single, mode indicator light ring 126 co-located about the knob, provide control and adjustment of different radio functions. Thus, operating modes such as volume control and channel control can be adjusted via the same multifunction control knob 124 while the mode indicator light ring 126 continues to provide different lighting configurations for each operating mode, as will be described in subsequent views.

Referring to FIG. 2, the mode indicator light ring 126 surrounds a base 128 of the multifunction control knob 124. FIG. 2 shows the mode indicator light ring 126 providing a concentric light ring configuration in accordance with an embodiment. The mode indicator light ring 126 indicates the operating mode of the multifunction control knob 124 (the radio function that the knob controls). When the multifunction control knob 124 is pushed inward 204 by a user 202, the knob 124 backs out automatically 204 changing an operating mode of the mobile radio 100. FIG. 2 provides an example of a primary mode or default of operation. For example, the mode indicator light ring 126 may be off 206 for a default volume mode. The user may rotate the multifunction control knob 124 to adjust the volume of the mobile radio 100.

Moving to FIG. 3, another press of the multifunction control knob 124 changes the knob mode to control a secondary mode of operation (in other words a different radio function). For example, the secondary mode of operation can provide channel control. FIG. 3 shows the mode indicator light ring 126 displaying a second lighting configuration in accordance with an embodiment. In this mode, the mode indicator light ring 126 displays a solid lighting configuration. The multifunction control knob 124 can now be rotated 304 by user 202 to adjust the secondary operating mode, such as channel control.

Moving to FIG. 4, when the multifunction control knob 124 is pressed again, or after a predetermined amount of time has elapsed (secondary mode times-out), the mode indicator light ring 126 turns off 206 and the knob reverts back to controlling the primary or default function. FIG. 4 shows the mode indicator light ring 126 reverted back to the light configuration displayed in FIG. 1 in accordance with an embodiment.

The rotary control of multifunction control knob 124 allows adjustments to be made to the enabled function. For example, push for volume control, then rotate to adjust the volume; push again for channel control and rotate to change the channel.

Figure 5:
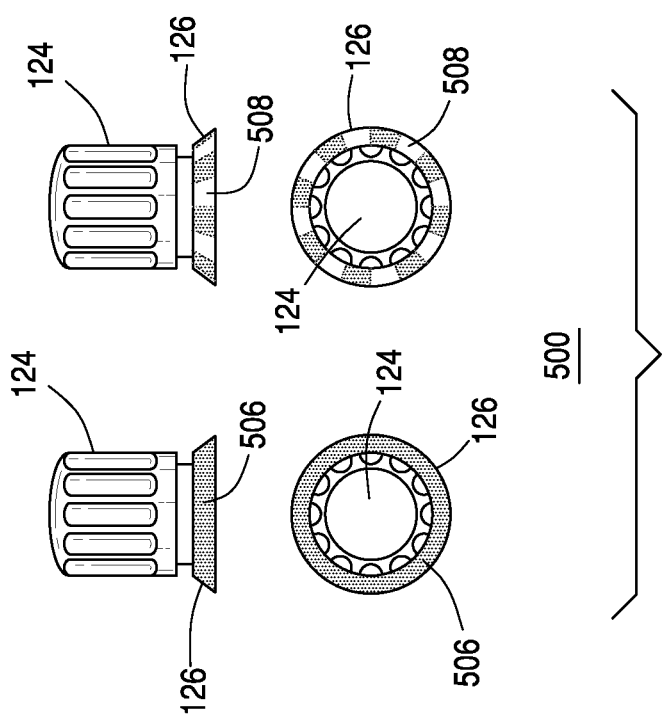
FIG. 5 shows alternative lighting display configurations for primary and secondary operating modes in accordance with an embodiment.

FIG. 5 shows an alternative lighting embodiment 500 with the primary default mode being represented by the mode indicator light ring 126 displaying a solid light configuration 506 about the base of the multifunction control knob 124, and the secondary mode being represented by the mode indicator light ring 126 displaying a segmented light display 508 about the base of the multifunction control knob 124.

Figure 6:
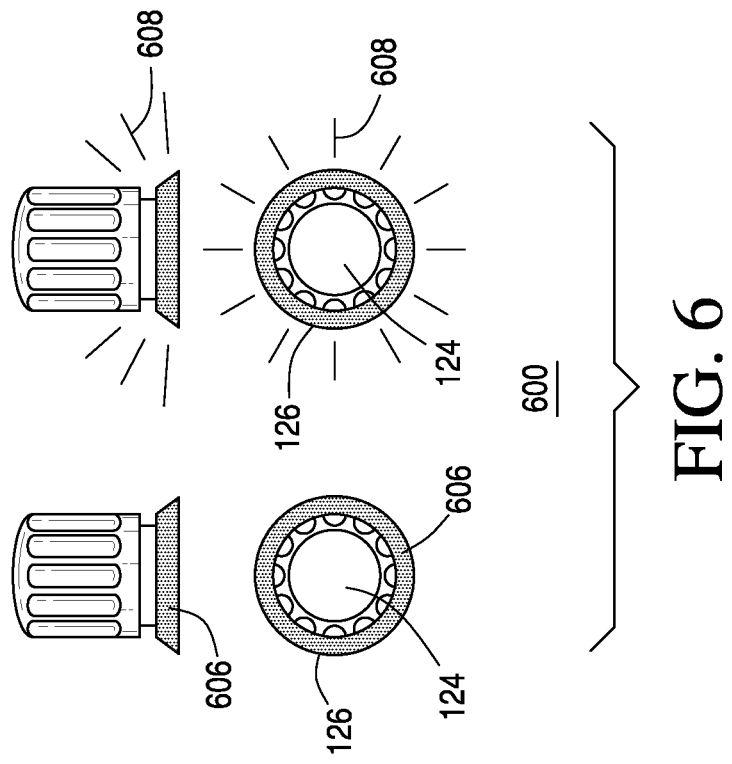
FIG. 6 shows alternative lighting display configurations for primary and secondary operating modes in accordance with an embodiment.

FIG. 6 shows an alternative lighting embodiment 600 with the primary or default mode being represented by the mode indicator light ring 126 displaying a solid light configuration 606 about the base of the multifunction control knob 124, and the secondary mode being represented by the mode indicator light ring 126 generating a flashing light configuration 608 about the base of the multifunction control knob 124.

Figure 7:
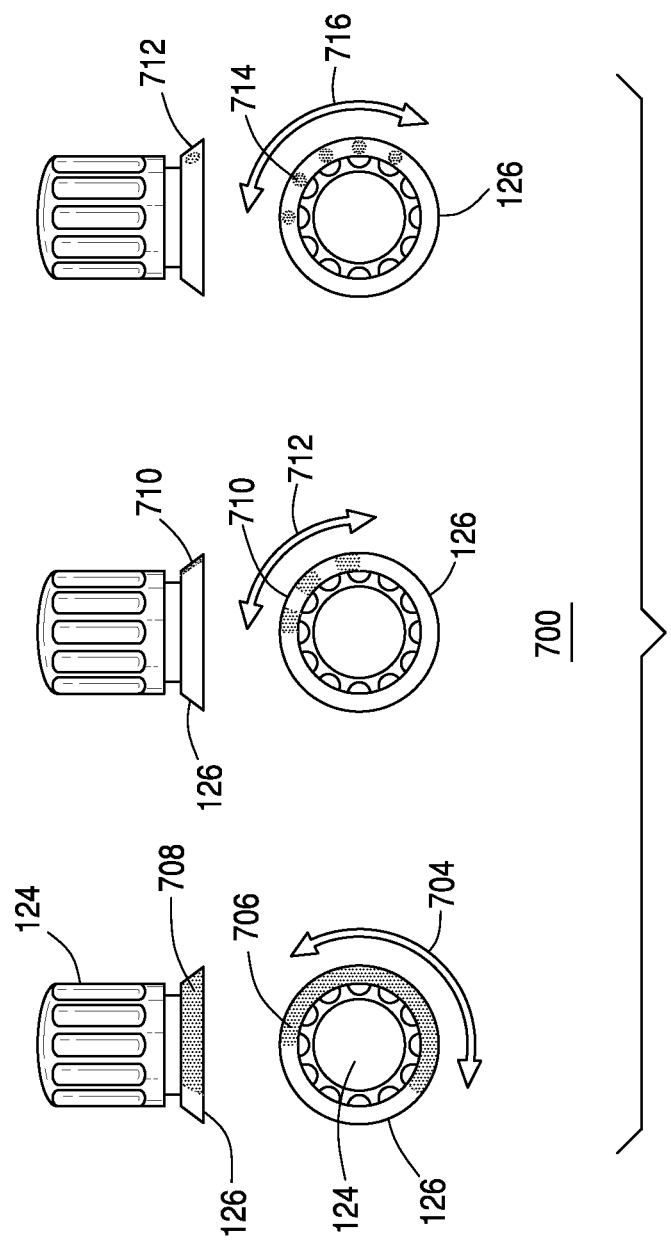
FIG. 7 shows alternative lighting display configurations for primary, secondary, and tertiary operating modes in accordance with an embodiment.

FIG. 7 shows an alternative lighting embodiment 700 in which the primary or default mode is displayed by the mode indicator light ring 126 projecting a variable arc of light 706 which can be increased and decreased in response to the adjusted function via rotation 704 of the multifunction control knob 124, for example volume control. The secondary function is displayed by the mode indicator light ring 126 projecting a variable length segmented light 710 which can be increased and decreased in response to the adjusted function via rotation 712 of the multifunction control knob 124, for example channel control. A tertiary function is displayed by the mode indicator light ring 126 projecting dotted segments 714 which can be increased and decreased about the ring in response to the adjusted function via rotation 716 of the control knob 124, for example frequency, talkgroup, or zone.

Additionally, different colors can be used within the light ring 126 to indicate that maximum or minimum predetermined values have been reached. For example, the mode indicator light ring can turn red when a predetermined maximum volume level has been reached during adjustment in the primary mode. Another example would be the mode indicator light ring 126 turning green when a priority home channel has been reached during adjustment of the secondary mode.

Thus different lighting configurations are available to the mode indicator light ring 126 which can be varied depending on the number of radio functions under the control of multifunction control knob 124. The mode indicator light ring 126 providing the different lighting configurations allows a single light ring and a single multifunction control knob 124 (with push/rotate control) to be used on a mobile radio as a multifunction control indicator to facilitate the user interface.

Accordingly, an improved mobile radio user interface has been provided by the various embodiments. The multifunction control indicator facilitates the user interface via the co-location of the mode light indicator ring and the multifunction control knob. Depending on the mode of the control, a different function is controlled and identified via the use of a single indicator ring. Thus, the mode indicators for different functions are no longer separated. The co-location of the multifunction control knob and single ring indicator allows various modes to be displayed which is particularly beneficial for a mobile radio operating in a public safety environment. Even under conditions of vehicular motion and vibration, the stability and coordination provided by the multifunction control knob 124 with co-located, mode indicator light ring 126 allows a user easy access to coordinate function changes to the mobile radio 100. During mission critical situations the ability to identify the operating mode at a glance and make adjustments via the co-located control is highly beneficial in terms of time and ease of use.

Unlike backlighting applications which do not indicate the mode of the control, the mode indicator light ring 126 operating in accordance with the various embodiments does indicate the operating mode and can indicate adjustments being made during that mode of operation. The multifunction control knob 124 and mode indicator light ring 126 facilitate the user's ability to know which function is being displayed and facilitates making adjustments to that function or to change the function at any given time. The use of a single multifunction control knob and single light indicator ring reduces the number of controls on the front control panel 104 of a vehicular mobile radio 100 while maintaining the functionally and adjustment of different modes of operation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A user interface for vehicular mobile radio, comprising:
a multifunction control knob controlling at least two operating modes of the vehicular mobile radio;
a mode indicator light ring surrounding a base of the multifunction control knob;
the mode indicator light ring indicating a primary operating mode of the vehicular mobile radio in response to a first press;
the multifunction control knob changing to a secondary operating mode in response to a subsequent press; and
the mode indicator light ring displaying different lighting configurations for each of the at least two operating modes;
wherein the primary operating mode is a volume control operating mode, and rotations of the multifunction control knob adjust volume while the mode indicator light ring provides a first lighting configuration; and wherein the secondary operating mode is a channel control operating mode, and during the channel control mode, rotation of the multifunction control knob changes channels while the mode indicator light ring displays a second lighting configuration.

2. The vehicular mobile radio of claim 1, wherein the mode indicator light ring does not display any light during the primary operating mode, and the mode indicator light ring displays light during the secondary operating mode.

3. The vehicular mobile radio of claim 1, wherein the mode indicator light ring displays the first lighting configuration during the primary operating mode and varies the first lighting configuration in response to the multifunction control knob being rotated to adjust the primary operating mode; and wherein the mode indicator light ring displays the second lighting configuration during the secondary operating mode and varies the second lighting configuration in response to the multifunction control knob being rotated to adjust the secondary operating mode.

4. The vehicular mobile radio of claim 1, wherein adjustments are made to the primary operating mode by rotating the multifunction control knob; and adjustments are made to the secondary operating mode by rotating the multifunction control knob.

5. The vehicular mobile radio of claim 1, wherein a further subsequent press of the multifunction control knob reverts control of the multifunction control knob back to the primary operating mode.

6. The vehicular mobile radio of claim 1, wherein the secondary operating mode times-out after a predetermined amount of time and reverts back to the primary operating mode.

7. The vehicular mobile radio of claim 1, wherein the vehicular mobile radio operates within a public safety environment.

8. The vehicular mobile radio of claim 1, wherein the multifunction control knob and mode indicator light ring provide a multifunction control indicator as the user interface, and the user interface controls and monitors a plurality of radio functions.

9. The vehicular mobile radio of claim 1, wherein the multifunction control knob is a rotary, push-type control knob, and the mode indicator light ring is disposed on a front control panel of the vehicular mobile radio providing a concentric light ring configuration about the multifunction control knob.

10. A vehicular mobile radio, comprising:
a front control panel;
a plurality of radio controls disposed on the front control panel including a multifunction control indicator, the multifunction control indicator comprising:
a multifunction control knob; and
a mode indicator light ring disposed on the front control panel surrounding a base of the multifunction control knob; and
the mode indicator light ring providing different lighting configurations for each operating mode of the multifunction control knob including at least a primary operating mode and a secondary operating mode, each operating mode of the multifunction control knob being enabled in response to being pressed;
wherein the primary operating mode is a volume control operating mode, and rotations of the multifunction control knob adjust volume while the mode indicator light ring provides a first lighting configuration; and wherein the secondary operating mode is a channel control operating mode, and during the channel control mode, rotation of the multifunction control knob changes channels while the mode indicator light ring displays a second lighting configuration.

11. The vehicular mobile radio of claim 10, wherein the mode indicator light ring displays additional different lighting configurations in response to the multifunction control knob being rotated.

12. The vehicular mobile radio of claim 10, wherein the mode indicator light ring comprises a single ring disposed on the front control panel about a perimeter of the multifunction control knob.

13. The vehicular mobile radio of claim 12, wherein the multifunction control knob comprises a rotary, push-type control knob.

14. The vehicular mobile radio of claim 10, wherein the front control panel further comprises: an emergency button, a display, a plurality of keys, and an accessory interface.

15. A method of operating a multifunction vehicular mobile radio, the method comprising:
in response to a first detected pressing of a multifunction control knob controlling at least two operating modes of the vehicular mobile radio, entering a volume adjusting mode and adjusting a volume of the mobile radio in response to rotations of the multifunction control knob while a mode indicator light ring surrounding a base of the multifunction control knob provides a first lighting configuration; and
in response to a subsequent detected pressing of the multifunction control knob controlling at least two operating modes of the vehicular mobile radio, entering a channel change mode and changing channels of the mobile radio in response to rotations of the multifunction control knob while the mode indicator light ring surrounding the base of the multifunction control knob provides a second lighting configuration.

* * * * *